United States Patent
Jang et al.

(10) Patent No.: US 10,644,602 B2
(45) Date of Patent: May 5, 2020

(54) ADAPTOR, POWER SUPPLY SYSTEM AND POWER SUPPLY METHOD THEREOF

(71) Applicant: SAMSUNG ELECTRONICS CO., LTD., Suwon-si (KR)

(72) Inventors: Duhee Jang, Suwon-si (KR); Jeongil Kang, Suwon-si (KR); Sanghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/353,651

(22) Filed: Mar. 14, 2019

(65) Prior Publication Data
US 2019/0341856 A1 Nov. 7, 2019

(30) Foreign Application Priority Data
May 4, 2018 (KR) .................. 10-2018-0051881

(51) Int. Cl.
*H02M 3/335* (2006.01)
*H02M 1/42* (2007.01)
*H02M 1/00* (2006.01)

(52) U.S. Cl.
CPC ......... *H02M 3/335* (2013.01); *H02M 1/4208* (2013.01); *H02M 3/33507* (2013.01); *H02M 2001/0058* (2013.01)

(58) Field of Classification Search
CPC ........... H02M 3/33576; H02M 1/4208; H02M 1/4233; H02M 1/4241; H02M 1/425; H02M 2001/007; H02M 1/42–4266
See application file for complete search history.

(56) References Cited

U.S. PATENT DOCUMENTS

| | | | |
|---|---|---|---|
| 9,991,788 B2 | 6/2018 | Oe et al. | |
| 10,305,374 B2* | 5/2019 | Yang | H02M 3/335 |
| 2004/0145584 A1* | 7/2004 | Lee | G09G 3/36 |
| | | | 345/212 |
| 2007/0253135 A1* | 11/2007 | Bovitz | H02M 1/10 |
| | | | 361/118 |
| 2008/0116812 A1 | 5/2008 | Lee | |

(Continued)

FOREIGN PATENT DOCUMENTS

| | | |
|---|---|---|
| JP | 2009-009386 A | 1/2009 |
| JP | 2017-118767 A | 6/2017 |

(Continued)

OTHER PUBLICATIONS

International Search Report (PCT/ISA/210) and Written Opinion (PCT/ISA/237) dated Jul. 12, 2019 issued by the International Searching Authority in International Application No. PCT/KR2019/003509.

*Primary Examiner* — Fred E Finch, III
*Assistant Examiner* — Sisay G Tiku
(74) *Attorney, Agent, or Firm* — Sughrue Mion, PLLC

(57) ABSTRACT

There is provided an adaptor, which includes an input circuit that rectifies an alternating current (AC) power input from outside the adaptor to a direct current (DC) voltage; a first converter that converts the rectified DC voltage to a first DC voltage in a specific level and an output circuit that applies the first DC voltage in the specific level to an electronic apparatus including a power factor correction (PFC) circuit.

15 Claims, 12 Drawing Sheets

(56) References Cited

U.S. PATENT DOCUMENTS

| | | | |
|---|---|---|---|
| 2009/0225575 A1* | 9/2009 | Vinciarelli | H02M 3/157 |
| | | | 363/125 |
| 2012/0294046 A1* | 11/2012 | Nate | H02M 1/4225 |
| | | | 363/21.01 |
| 2013/0047030 A1 | 2/2013 | Soeda et al. | |
| 2013/0169517 A1 | 7/2013 | Cho et al. | |
| 2014/0043862 A1* | 2/2014 | Luh | H02M 3/337 |
| | | | 363/17 |
| 2016/0181932 A1 | 6/2016 | Kikuchi et al. | |
| 2017/0117810 A1* | 4/2017 | Ghosh | H02M 1/4225 |
| 2017/0170734 A1* | 6/2017 | Sheng | H02M 3/33507 |
| 2017/0187215 A1* | 6/2017 | Noda | H01M 10/44 |
| 2018/0219474 A1* | 8/2018 | Greetham | H02M 1/4208 |
| 2018/0309372 A1* | 10/2018 | Leong | H02M 3/33546 |

FOREIGN PATENT DOCUMENTS

| | | |
|---|---|---|
| KR | 10-1251935 B1 | 4/2013 |
| KR | 10-2016-0089213 A | 7/2016 |
| KR | 10-1768224 B1 | 8/2017 |
| WO | 2018139802 A1 | 8/2018 |

\* cited by examiner

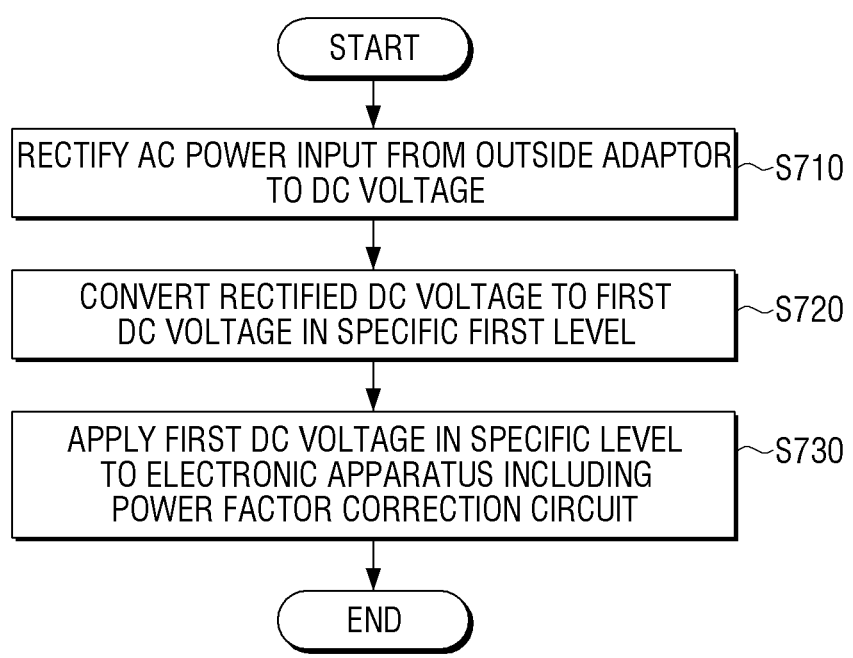

ADAPTOR, POWER SUPPLY SYSTEM AND POWER SUPPLY METHOD THEREOF

CROSS-REFERENCE TO RELATED APPLICATION

This application is based on and claims priority under 35 U.S.C. § 119(a) of a Korean Patent Application number 10-2018-0051881, filed on May 4, 2018, in the Korean Intellectual Property Office, and the disclosure of which is incorporated by reference herein in its entirety.

BACKGROUND

1. Field

The disclosure relates to an adaptor, a power supply system, and a power supply method thereof, and more particularly to an adaptor to supply power to an electronic apparatus and a power supply method thereof.

2. Description of Related Art

In general, an adaptor functions to receive alternating current (AC) power and convert it into a direct current (DC) voltage, and to apply a DC voltage to an electronic apparatus connected through a cable.

With the development of electronic technology, efforts have been made for an electronic apparatus (e.g., a light emitting diode (LED) TV) to use a high voltage adaptor which supplies a high level of DC voltage in order to reduce the thickness of a cable connecting the electronic apparatus and the adaptor.

However, in this case, the thickness of the cable can be reduced, but the size of the adaptor itself becomes very large, causing a problem.

Accordingly, there is a need for a method for reducing the size of an adaptor.

SUMMARY

The disclosure is to address at least the above-mentioned problems and/or disadvantages and to provide at least the advantages described below. Accordingly, the disclosure is to provide an adaptor capable of receiving an AC voltage and converting the AC voltage into a DC voltage and transmitting the converted voltage to an electronic apparatus having a power factor correction (PFC) circuit, a power supply system and a power supply method thereof.

In accordance with an aspect of the disclosure, there is provided an adaptor comprising: an input circuit configured to rectify an alternating current (AC) power input from outside the adaptor to a direct current (DC) voltage; a first converter configured to convert the rectified DC voltage to a first DC voltage in a specific level; and an output circuit configured to apply the first DC voltage in the specific level to an electronic apparatus including a power factor correction (PFC) circuit.

The electronic apparatus maybe further configured to: boost the first DC voltage applied from the adaptor through the PFC circuit, convert the boosted first DC voltage to a low voltage, and apply the converted low voltage to one or more components of the electronic apparatus.

The boosted first DC voltage through the PFC circuit maybe converted to a first voltage and applied to a display panel of the electronic apparatus, and the boosted first DC voltage through the PFC circuit maybe be is converted to a second voltage and applied to a main board of the electronic apparatus.

The input circuit may comprise a rectification circuit that rectifies the input AC power to the DC voltage.

The first converter may comprise at least one of a half bridge converter, a full bridge converter, a flyback converter and a logical link control (LLC) resonant converter.

The adaptor may further comprise: a second converter configured to convert the rectified DC voltage to a second DC voltage in a specific level, wherein the specific level of the second DC voltage that is output from the second converter maybe smaller than the specific level of the first DC voltage that is output from the first converter.

According to another aspect of the disclosure, there is provided a power supply method of an adaptor, the method comprising: rectifying an alternating current (AC) input from outside the adaptor to a direct current (DC) voltage; converting the rectified DC voltage to a first DC voltage in a specific first level; and applying the first DC voltage in the specific first level to an electronic apparatus including a power factor correction (PFC) circuit.

The method may further comprise: boosting the first DC voltage applied from the adaptor through the PFC circuit, converting the boosted first DC voltage to a low voltage, and applying the converted low voltage to one or more components of the electronic apparatus.

The boosted first DC voltage through the PFC circuit maybe converted to a first voltage and applied to a display panel of the electronic apparatus, and the boosted first DC voltage through the PFC circuit maybe converted to a second voltage and applied to a main board of the electronic apparatus.

The rectifying may comprise, based on the AC being input from an outside, rectifying the input AC power to the DC voltage using a rectification circuit.

The converting may comprise converting the rectified DC voltage to the first DC voltage in the specific first level using at least one of a half bridge converter, a full bridge converter, a flyback converter and a logical link control (LLC) resonant converter.

The method may further comprise: converting the rectified DC voltage to a second DC voltage in a specific second level, wherein the specific second level of the second DC voltage maybe smaller than the specific first level of the first DC voltage.

According to another aspect of the disclosure, there is provided a power supply system comprising: an adaptor configured to: rectify an alternating current (AC) power input from outside the adaptor to a direct current (DC) voltage; and convert the rectified DC voltage to a first DC voltage in a specific level; and an electronic apparatus configured to: receive, from the adaptor, the first DC voltage in the specific level, and boost the first DC voltage through a power factor correction (PFC) circuit.

The electronic apparatus maybe configured to: convert the boosted first DC voltage to a low voltage and apply the converted low voltage to one or more components of the electronic apparatus.

The electronic apparatus maybe configured to: convert the boosted first DC voltage to a first voltage and apply the first voltage to a display panel of the electronic apparatus, and convert the boosted first DC voltage to a second voltage and apply the second voltage to a main board of the electronic apparatus.

The adaptor may comprise a rectification circuit that rectifies the input AC power to the DC voltage.

The adaptor maybe configured to convert the input AC power to the first DC voltage in the specific level using at least one of a half bridge converter, a full bridge converter, a flyback converter and a logical link control (LLC) resonant converter.

The adaptor maybe configured to: convert the rectified DC voltage to the first DC voltage in the specific level and apply the first DC voltage to the electronic apparatus, and convert the rectified DC voltage to a second DC voltage in a specific level and apply the second voltage to the electronic apparatus.

As described above, according to various embodiments of the disclosure, a size of an adaptor may be decreased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, and advantages of certain embodiments of the disclosure will be more apparent from the following description taken in conjunction with the accompanying drawings, in which:

FIG. 7 is a flowchart to describe a power supply method according to an embodiment of the disclosure.

The same reference numerals are used to represent the same elements throughout the drawings.

DETAILED DESCRIPTION

Figure 1:
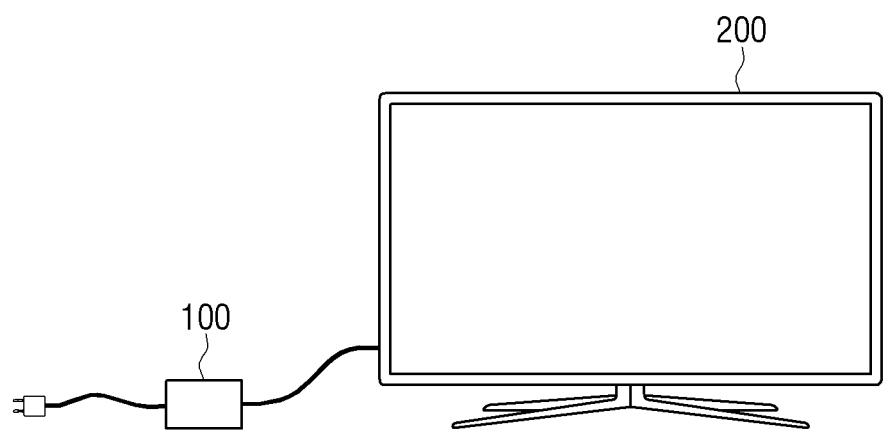
FIG. 1 is a view to describe a power supply system according to an embodiment of the disclosure.

Hereinafter, embodiments of the disclosure will be described with reference to the accompanying drawings. However, it may be understood that the disclosure is not limited to the embodiments described hereinafter, but includes various modifications, equivalents, and/or alternatives of the embodiments of the disclosure. In relation to explanation of the drawings, similar drawing reference numerals may be used for similar constituent elements.

In the description, the term "has," "may have," "includes" or "may include" indicates existence of a corresponding feature (e.g., a numerical value, a function, an operation, or a constituent element such as a component), but does not exclude existence of an additional feature.

In the description, the term "A or B," "at least one of A or/and B," or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements.

If it is described that an element (e.g., first element) is "operatively or communicatively coupled with/to" or is "connected to" another element (e.g., second element), it may be understood that the element may be connected to the other element directly or through still another element (e.g., third element). When it is mentioned that one element (e.g., first element) is "directly coupled" with or "directly connected to" another element (e.g., second element), it may be understood that there is no element (e.g., third element) present between the element and the other element.

Herein, the expression "configured to" can be used interchangeably with, for example, "suitable for", "having the capacity to", "designed to", "adapted to", "made to", or "capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that can perform the corresponding operations by executing one or more software programs stored in the memory device.

FIG. 1 is a view to describe a power supply system according to an embodiment of the disclosure.

Referring to FIG. 1, an adaptor 100 may be connected to an outlet installed on an indoor wall or a multi-tap connected to an outlet of various places such as a household, a company, or the like and receive an AC power source (for example, commercial AC power).

The adaptor 100 may convert the AC power into a DC voltage and apply the DC voltage to an electronic apparatus 200 connected to the adaptor 100 through a cable.

Here, the electronic apparatus 200 may be implemented as a TV (for example, an LED TV) as illustrated in FIG. 1.

In this case, the electronic apparatus 200 may compensate the power factor of the power supplied from the adaptor 100, and convert the DC voltage applied from the adaptor 100 to a high-voltage DC voltage. To this end, the electronic apparatus 200 may include a power factor correction (PFC) circuit. The electronic apparatus 200 can then convert the high voltage DC voltage to a DC voltage of various levels required by the electronic apparatus 200 and drive the various components of the electronic apparatus 200 using the converted DC voltage.

As described above, according to the various embodiments of the disclosure, the electronic apparatus 200, not the adaptor 100, is provided with the PFC circuit and thus, the size of the adaptor 100 can be decreased.

FIG. 2 is a view to describe a configuration of an adaptor according to an embodiment of the disclosure.

Figure 2A:
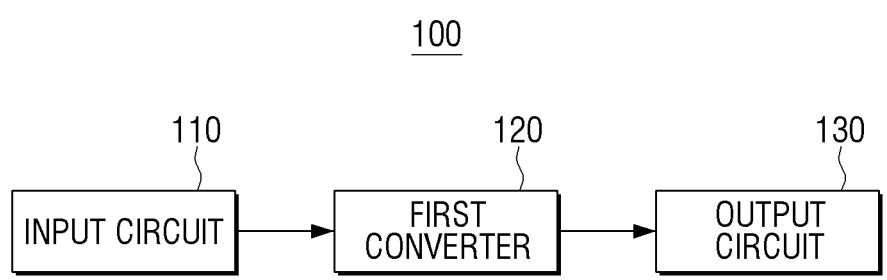
FIG. 2A is a block diagram to describe a configuration of an adaptor according to an embodiment of the disclosure.

FIG. 2A is a block diagram to describe a configuration of an adaptor according to an embodiment of the disclosure.

The adaptor 100, as illustrated in FIG. 2A, includes an input circuit 110, a first converter 120, and an output circuit 130.

The input circuit 110 receives AC power. For this purpose, the input circuit 110 may include a plug to be connected to an outlet installed on an indoor wall of various spaces such as a house and a company or a multi-tap connected to the outlet, and a cable for connecting a plug and the electronic apparatus 100, and the like.

Further, the input circuit 110 may rectify the inputted AC power to a DC voltage.

To this end, the input circuit 110 may include a rectification circuit for rectifying the inputted AC power to a DC voltage. For example, the input circuit 110 may include a bridge rectification circuit in which a plurality of diodes are connected in a bridge form.

A first converter 120 may convert a DC voltage to a voltage of a specific level.

That is, the first converter 120 may convert a DC voltage rectified by the input circuit 110 to a voltage of a specific level.

To this end, the first converter 120 may include a DC/DC converter. The DC/DC converter according to various embodiments of the disclosure may be implemented with a half bridge converter, a full bridge converter, a flyback converter, or a logical link control (LLC) resonant converter.

The DC/DC converter will be described later with FIG. 3.

The adaptor 100 may perform a switching operation of a switching element provided in a DC/DC converter via a high frequency, accordingly, the adaptor can be seen as a high frequency AC converter.

An output circuit 130 may provide a DC voltage of a specific level to the electronic apparatus 200 having the PFC circuit.

To this end, the output circuit 130 may include a cable. That is, the output circuit 130 may apply the DC voltage generated by the first converter 120 to the electronic apparatus 200 through a cable.

Figure 2B:
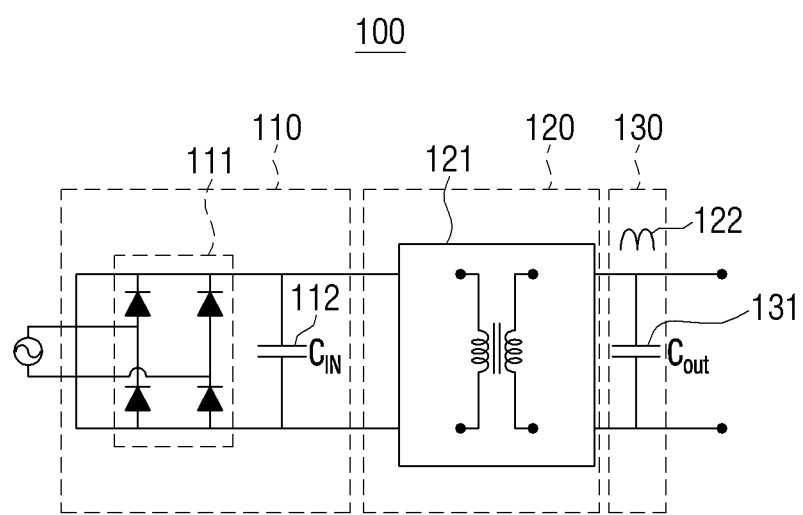
FIG. 2B is a view to describe a circuit diagram of an adaptor according to an embodiment of the disclosure.

FIG. 2B is a view to describe a circuit diagram of an adaptor 100 as illustrated in FIG. 2A.

Referring to FIG. 2B, the input circuit 110 receives AC power. In this case, the input circuit 110 may generate a DC voltage by rectifying the AC power inputted through a rectification circuit 111. In this case, the DC voltage can be transferred to an input capacitor 112 connected to the rectification circuit 111.

The first converter 120 may convert the rectified DC voltage generated through the rectification circuit 111 to a first DC voltage of a specific level. At this time, the converted voltage can be represented by a waveform such as 122.

To this end, the first converter 120 may include at least one of the DC/DC converter 121, and the DC/DC converter 121 may be implemented with a half bridge converter, a full bridge converter, a flyback converter and a logical link control (LLC) resonant converter.

Figure 3A:
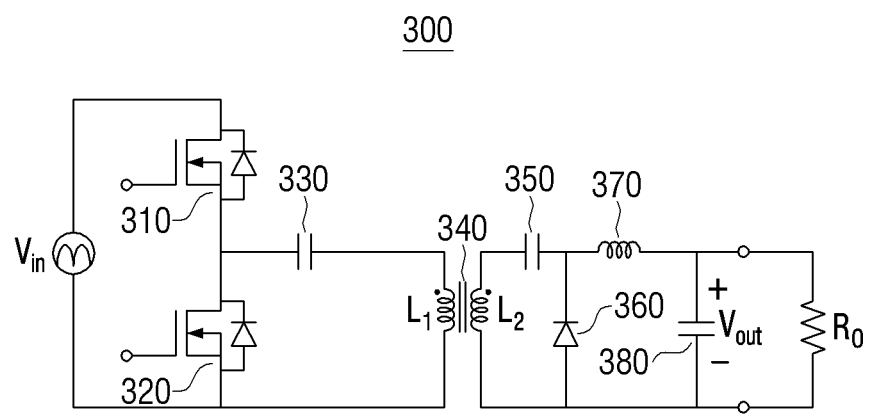
FIG. 3A is a view to describe a converter according to an embodiment of the disclosure.

As shown in FIG. 3A, the half bridge converter 300 may include a first switch 310, a second switch 320, a first capacitor 330, a transformer 340 including a primary coil L1 and a secondary coil L2, a second capacitor 350, a diode 360, an inductor, an inductor 370 and a third capacitor 380.

The first switch 310 and the second switch 320 are connected to an input voltage Vin.

One end of the first capacitor 330 is connected to a terminal to which the first switch 310 and the second switch 320 are commonly connected, and the primary coil L1 of the transformer 340 is connected to the other end of the first capacitor 330.

One end of a second capacitor 350 is connected to the secondary coil L2 of the transformer 340, and an end of the diode 360 and an end of the inductor 370 are commonly connected to the other end of the second capacity 350. One end of a third capacitor 380 is connected to the other end of the inductor 370. The other end of the diode 360 and the other end of the third capacitor 380 are commonly connected to the secondary coil L2 of the transformer 340.

In this case, the half bridge converter 300 may output a constant output voltage Vout to load Ro using the input voltage Vin.

Specifically, the primary and secondary coils L1 and L2 of the transformer 340 are inductively coupled to each other and may have a winding ratio according to a voltage desired to be output. In this case, when the first switch 310 is turned on, a voltage is applied to the primary coil L1, and a voltage applied to the primary coil L1 may be induced to the secondary coil L2. The second switch 320 is turned on when the first switch 310 is turned off, and leakage and magnetizing inductance current of the transformer 340 may be returned. Accordingly, an output voltage Vout of a specific level can be applied.

Figure 3B:
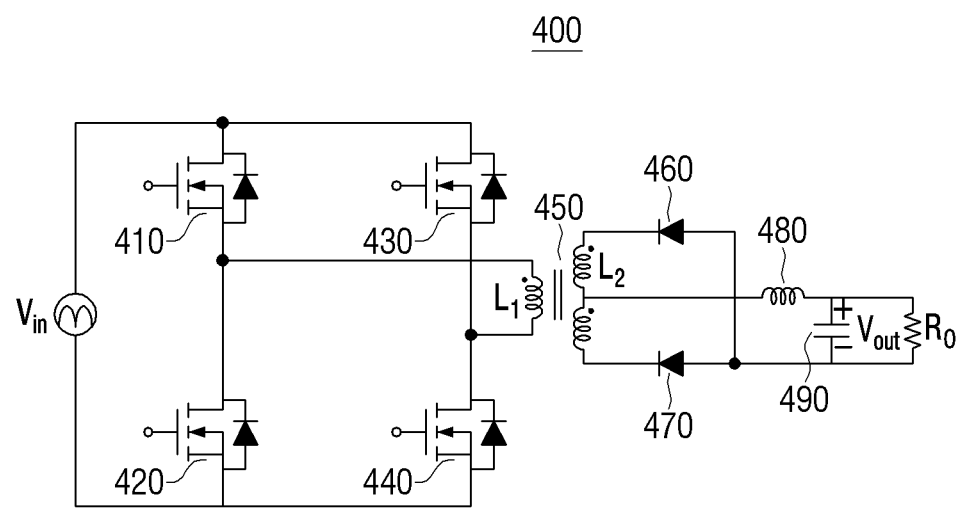
FIG. 3B is a view to describe a converter according to various embodiments of the disclosure.

As illustrated in FIG. 3B, the full bridge converter 400 may include first to fourth switches 410, 420, 430 and 440, a transformer 450, a first diode 460, a second diode 470, an inductor 480, and a capacitor 490.

First, the first to fourth switches 410, 420, 430, and 440 are connected to the input voltage Vin. The primary coil L1 of the transformer 450 is connected to the terminal to which the first switch 410 and the second switch 420 are commonly connected and the terminal to which the third switch 430 and the fourth switch 440 are commonly connected.

One end of the first diode 460, one end of the second diode 470, and one end of the inductor 480 are connected to the secondary coil L2 of the transformer 450. The other end of the inductor 480 is connected to one end of the capacitor 490 and the other end of the capacitor 490 is connected to the other end of the first diode 460 and the other end of the second diode 470 commonly.

In this case, the full bridge converter 400 may output a constant output voltage Vout to load Ro using the input voltage Vout.

Specifically, the primary and secondary coils L1 and L2 of the transformer 450 are inductively coupled to each other and may have a winding ratio according to a voltage desired to be output. In this case, when the first switch 410 and the fourth switch 440 are turned on→the first switch 410 and the third switch 430 are turned on→the second switch 410 and the third switch 430 are turned on→the second switch 420 and the fourth switch 440 are turned on, so that the output voltage Vout of a specific level can be applied.

Figure 3C:
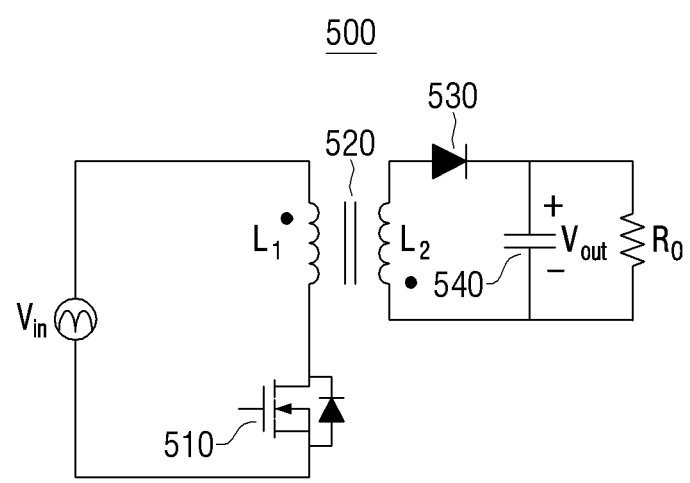
FIG. 3C is a view to describe a converter according to various embodiments of the disclosure.

Meanwhile, the flyback converter 500 may include a switch 510, a transformer 520, a diode 530, and a capacitor 540, as shown in FIG. 3C.

First, the switch 510 and the primary coil L1 of the transformer 520 are connected to the input voltage Vin.

One end of the diode 530 is connected to the secondary coil L2 of the transformer 520 and the other end of the diode 530 is connected to one end of the capacitor 540. The other end of the capacitor 540 is connected to the secondary coil L2 of the transformer 520.

In this case, the flyback converter 500 may output a constant output voltage Vout to load Ro using the input voltage Vout.

Specifically, the primary and secondary coils L1 and L2 of the transformer 520 are inductively coupled to each other and may have a winding ratio according to a voltage desired to be output.

In this case, when the switch 510 is turned on, a voltage is applied to the primary coil L1 of the transformer 520, and a voltage applied to the primary coil L1 may be induced to the secondary coil L2. At this time, a voltage is applied to the reverse direction of the diode 530, and no current flows through the primary and secondary coils L1 and L2. However, current flows only over the magnetizing inductor of the transformer 520.

Thereafter, when the switch 520 is turned off, a current flowing in the magnetizing inductor flows in the primary coil L1, and a current flows in the secondary coil L2 by the current flowing in the primary coil L1, and as a result, the output voltage Vout of a specific level can be applied.

Figure 3D:
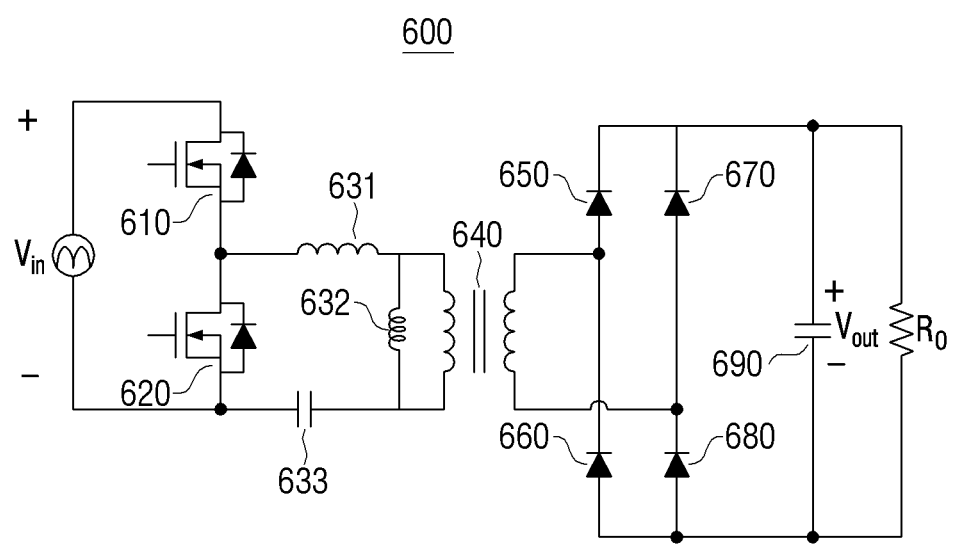
FIG. 3D is a view to describe a converter according to various embodiments of the disclosure.

As illustrated in FIG. 3D, the LLC resonant converter may include a first switch 610, a second switch 620, a leakage inductor 631, a magnetizing inductor 632, a resonant capacitor 633, a transformer 640, first to fourth diodes 650, 660, 670, 680 and a capacitor 690.

First, the first switch 610 and the second switch 620 are connected to the input voltage Vin. A leakage inductor 631, a magnetizing inductor 632, and a resonance capacitor 633 are connected between the second switch 620 and the primary coil L1 of the transformer 640. At this time, the magnetizing inductor 632 may be connected in parallel with the primary coil L1 of the transformer 640, and the leakage inductor 631 may serve as a resonance inductor of the transformer 640.

Meanwhile, the secondary coil L2 of the transformer 640 is connected to the first to fourth diodes 650, 660, 670 and 680. The secondary coil L2 of the transformer 640 may be connected to the terminal to which the first diode 650 and the second diode 660 are commonly connected and the terminal to which the third diode 670 and the fourth diode 680 are commonly connected. The capacitor 690 is connected to the first to fourth diodes 650, 660, 670 and 680.

In this case, the LLC resonant converter 600 can output a constant output voltage Vout to the load (load, Ro) by using the input voltage Vin.

Specifically, the primary and secondary coils L1 and L2 of the transformer 640 are inductively coupled to each other and may have a winding ratio according to a voltage to be output. In this case, the first switch 610 and the second switch 620 are alternately turned on/off and the voltage can be induced to the secondary coil L2. Accordingly, an output voltage Vout of a specific level can be applied.

In the converter of FIGS. 3A to 3D, a secondary side circuit of the transformer may change in a diverse manner.

The first converter 120 may generate a voltage of a specific level and transmit the generated voltage to the output capacitor 131 of the output circuit 130.

In this case, the output circuit 130 may provide the voltage applied to the output capacitor 131 to the electronic apparatus 200 through a cable.

Figure 4:
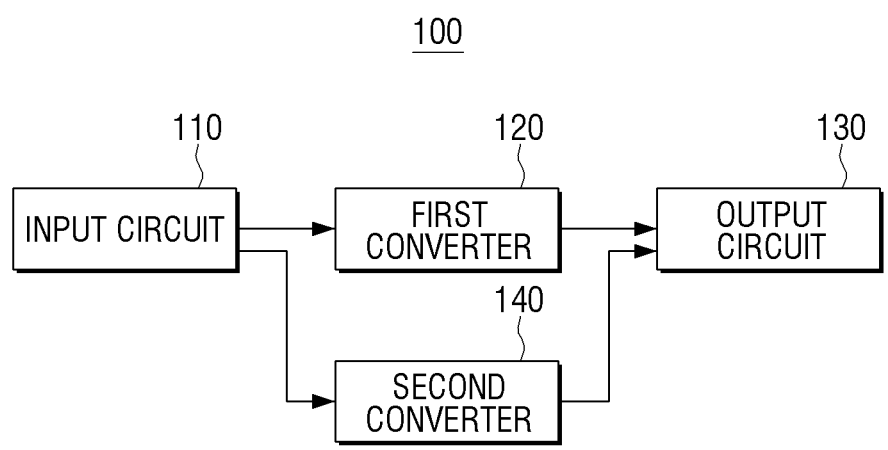
FIG. 4 is a view to describe a configuration of an adaptor according to an embodiment of the disclosure.

FIG. 4 shows a block diagram of an adaptor 100 according to one embodiment of the disclosure. The adaptor 100 includes the input circuit 110, the first converter 120, the output circuit 130 and the second converter 140, as shown in FIG. 2A. The descriptions of the input circuit 110, the first converter 120, and the output circuit 130 that are the same as those described in FIG. 2A will be omitted.

The second converter 140 may convert a rectified DC voltage to a second DC voltage of a specific level.

That is, the second converter 140 may convert a DC voltage rectified by the input circuit 110 to a second DC voltage of a specific level.

To this end, the second converter 140 may include a DC/DC converter. Here, the DC/DC converter may be implemented as a half bridge converter, a full bridge converter, a flyback converter, or an LLC resonant converter.

Here, the level of the second DC voltage converted by the second converter 140 may be smaller than the level of the first DC voltage converted by the first converter 120.

That is, the first DC voltage converted by the first converter 120 may be used to supply the operating power of the electronic apparatus 200, and the second DC voltage converted by the second converter 140 may be used to supply the standby power source of the electronic apparatus 200. Here, the standby power source may be a minimum power source required to receive a control signal received from a remote controller (not shown) or the like while the operation power of the electronic apparatus 200 is turned off.

In the meantime, in that the bridge converter, the full bridge converter, the flyback converter or the LLC resonant converter as described in FIGS. 3A to 3D may be used for the DC/DC converter constituting the second converter 140, and a detailed description thereof will be omitted.

The output circuit 130 may provide a DC voltage generated by the second converter 140 to the electronic apparatus 200 connected through a cable.

FIG. 5 is a block diagram to describe a configuration of an electronic apparatus according to an embodiment of the disclosure.

Figure 5A:
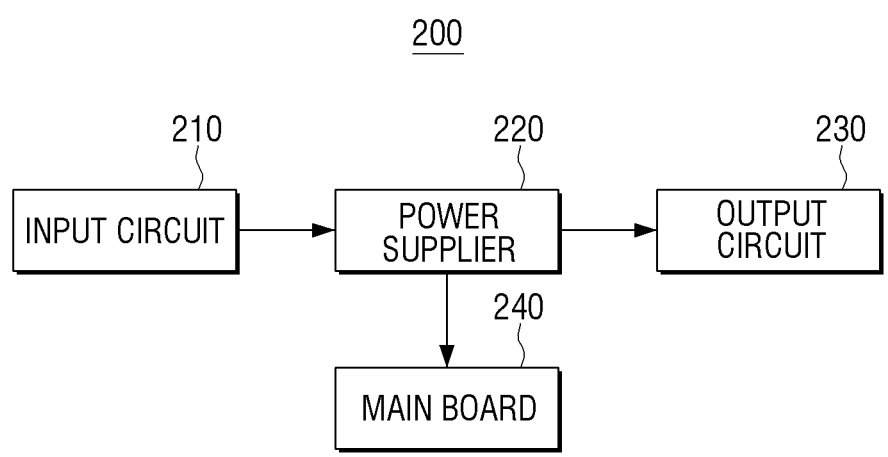
FIG. 5A is a block diagram to describe a configuration of an electronic apparatus according to an embodiment of the disclosure.

Referring to FIG. 5A, the electronic apparatus 200 may include an input circuit 210, a power supplier 220, a panel 230, and a main board 240.

The input circuit 210 is connected to the adaptor 100 by a cable and may receive power from the adaptor 100.

The power supplier 220 may generate a voltage for driving the electronic apparatus 200 using power supplied from the adaptor 100.

Figure 5B:
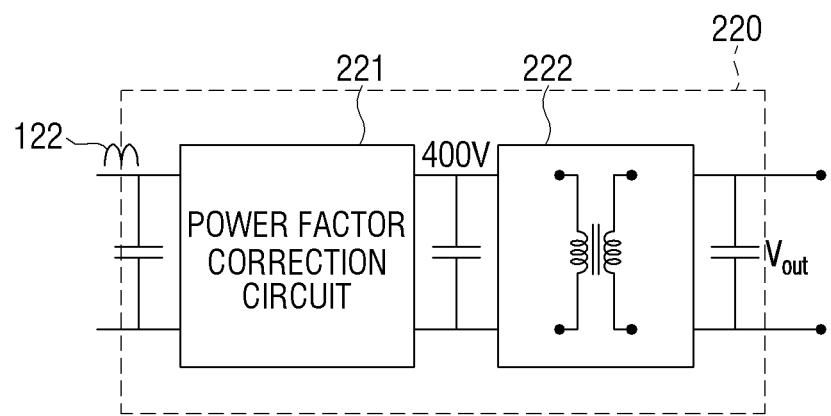
FIG. 5B is a view to describe an electronic apparatus according to an embodiment of the disclosure.

To this end, the power supplier 220 may include a switching mode power supply (SMPS) including a power factor correction circuit 221 and a converter 222, as shown in FIG. 5B.

The SMPS is an apparatus which converts an input DC voltage into a square wave type voltage by using a semiconductor device as a high speed switch, and obtains a rectified DC voltage through a filter.

First, the power factor correction circuit 221 may correct the power factor of the power supplied from the adaptor 100, and convert the DC voltage applied from the adaptor 100 into a DC voltage of high voltage (for example, a DC voltage of 400 [V]). The power factor correction circuit 221 can adjust the phase of the voltage and current supplied from the adaptor 100.

Here, the voltage applied from the adaptor 100 may be represented as a waveform such as 122.

The converter 222 may convert a DC with high voltage to a voltage of a specific level. For this, the converter 222 may include a DC/DC converter.

In this case, the converter 222 may convert a high-voltage DC voltage to low-voltage AC voltage in various levels required from the electronic apparatus 200 and output the same.

For example, the converter 222 may receive a DC voltage of 400 [V], convert the DC voltage of 400 [V] into a DC voltage required by the panel 230, and apply the DC voltage to the panel 230, or convert the DC voltage of 400 [V] into a DC voltage required by the main board 240 and apply the same to the main board 240.

The panel 230 may display an image using power source supplied from the power supplier 220.

To this end, the panel 230 may include a panel driver (not shown) and a display panel (not shown).

The panel driver (not shown) may generate a driving signal to drive a display panel (not shown) using a DC voltage provided from the power supply 220, and provide the generated driving signal to the display panel (not shown).

The display panel (not shown) may be implemented as various types of displays such as a Liquid Crystal Display (LCD), Organic Light Emitting Diodes (OLED) display, a Plasma Display Panel (PDP), and the like. In the display panel (not shown), a driving circuit which can be implemented in a form of an a-si TFT, a low temperature poly silicon (LTPS) TFT, an organic TFT (OTFT), and a backlight unit may be included. Meanwhile, the display panel (not shown) may be implemented as a touch screen.

Meanwhile, when the display panel (not shown) is configured as an LCD panel that transmits light emitted from the backlight through the LCD or displays the grayscale by adjusting the degree of transmission, the display panel (not shown) receives power supplied from the power supplier 220, and transmits light emitted from the backlight. The display panel (not shown) may receive power, from the power supplier 220, which are used for the pixel electrode and the common electrode, adjust the liquid crystal according to the driving signal input from the panel driver, and display an image.

Here, the backlight emits light to the LCD, and may be configured as a Cold Cathode Fluorescent Lamp (CCFL) and a Light Emitting Diode (LED), or the like.

When a light emitting diode is used for light emission, a panel driver (not shown) may include an LED driver (not shown) for driving the LED. In this case, the LED driver (not shown) may provide a constant current corresponding to a brightness value to the LED to drive the backlight with a brightness value corresponding to the dimming information.

In a main board 240, a processor (not shown) for controlling the operation of the electronic apparatus 200 may be disposed. For example, a processor (not shown) may be an application processor (AP), a central processing unit (CPU), a micro controller (MCU), and the like.

In the main board 240, a memory (not shown) for storing data required for an operation of the electronic apparatus 20 may be disposed.

In addition, according to an embodiment, various modules may be disposed in the main board 150.

For example, the main board 150 may be provided with a broadcast receiver (not shown), a signal separator (not shown), and an audio/video (a/v) processer (not shown), and the module may be controlled by a processor (not shown).

The broadcast receiver (not shown) receives broadcast from a broadcasting station or a satellite in a wired or wireless manner and demodulates the broadcast.

Specifically, a broadcast receiver (not shown) receives and demodulates a transport stream through an antenna or a cable to output a digital transport stream signal (specifically, a clock signal TS_CLK, a sync signal TS_SYNC, a valid signal TS_VALID, and eight data signals TS_DATA [7:0]). In addition, a broadcast receiver (not shown) may receive broadcast signals from an external device (e.g., a set-top box).

The signal separator (not shown) separates a transport stream signal provided from a broadcast receiver (not shown) into a video signal, an audio signal, and an additional information signal. The signal separator (not shown) transmits the video signal and the audio signal to an A/V processor (not shown).

The A/V processor (not shown) performs signal processing such as video decoding, video scaling, and audio decoding on a video signal and an audio signal input from a broadcast receiver (not shown). The A/V processor (not shown) outputs a video signal to a panel driver (not shown), and outputs an audio signal through a speaker (not shown) provided in the electronic apparatus 200.

As described above, the electronic apparatus 200 may boost the DC voltage supplied from the adaptor 100 through the power factor correction circuit 221 and convert the boosted voltage to a low voltage and use the converted voltage.

Specifically, the electronic apparatus 200 may convert the boosted voltage to a first voltage, apply the DC voltage to the display panel of the electronic apparatus 200, convert the boosted voltage to a second voltage, and apply the voltage to the main board of the electronic apparatus 200.

As described above, according to various embodiments of the disclosure, a power factor correction circuit is provided on the electronic apparatus 200, not the adaptor 100, and the power factor correction circuit is provided in the electronic apparatus 200, a capacitor of a small capacitance (e.g., a capacitor of a small capacitance of μF) may be used as an input capacitor and an output capacitor of the adaptor 100, and accordingly, the level of the adaptor 100 can be reduced.

According to an embodiment of the disclosure, the reason why the power factor correction unit may be provided in the electronic apparatus 200, not in the adaptor 100, may be described with reference to FIG. 6.

Figure 6:
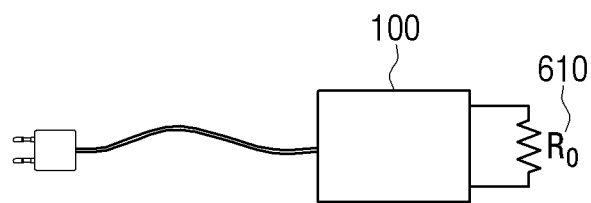
FIG. 6 is a view to describe a relation between an adaptor and a power factor correction circuit according to an embodiment of the disclosure.

Specifically, FIG. 6 indicates an equivalent circuit of power supply system as illustrated in FIG. 1.

According to one embodiment of the disclosure, the power factor correction circuit is included in the electronic apparatus 200. Here, the power factor correction circuit performs a function of allowing the phase of the voltage and the current to be equal to each other. In this regards, the electronic apparatus 200 from a viewpoint of the adaptor 100 may be represented as one equivalent resistance Ro as shown in FIG. 6.

As such, the electronic apparatus 200 may be represented as one equivalent resistance Ro 610. In this regard, the phase of the input voltage and the phase of the input current are equal to each other at the primary side of the transformer of the DC/DC converter included in the adaptor 100, and when the adaptor 100 is viewed from a side (e.g., an outlet, etc.) providing AC power, the phase of the voltage and the current are equal.

As a result, even if the electronic apparatus 200 is equipped with the power factor correction circuit, the phase of the voltage and the phase of the current are equal in a viewpoint of the input of the adaptor 100 and thus, the power factor correction circuit may be provided in the electronic apparatus 200, not the adaptor 100.

FIG. 7 is a flowchart to describe a power supply method according to an embodiment of the disclosure.

First of all, an AC power is input from the outside, and the input AC power is rectified to a DC voltage in step S710.

Then, the rectified DC voltage is converted to a first DC voltage of a specific voltage in a first level in step S720.

The first DC voltage in the specific level is applied to an electronic apparatus including a power factor correction circuit of a specific level in step S730.

In this case, the electronic apparatus may boost the first DC voltage applied from the adaptor through the power factor correction circuit, convert the boosted voltage into a low voltage, and use the converted low voltage.

Specifically, the electronic apparatus may convert the boosted voltage to the first voltage and apply the voltage to the display panel of the electronic apparatus, and convert the boosted voltage to the second voltage and provide the voltage to the main board of the electronic apparatus.

The input AC power may be rectified to the DC voltage.

In step S720, the rectified DC voltage may be converted into the first DC voltage of the first level using a half bridge converter, a full bridge converter, a flyback converter, or an LLC resonant converter.

The rectified DC voltage may be converted to a second DC voltage of a specific second level. Here, the second DC voltage of the specific second level may be smaller than the first voltage of the specific first level.

The specific description of the power supply method has been described above.

Meanwhile, various embodiments of the disclosure may be implemented in software, including instructions stored on machine-readable storage media readable by a machine (e.g., a computer). An apparatus may call instructions from the storage medium, and execute the called instruction, including an electronic apparatus (for example, electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to the above-described embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™ and App Store™) or distributed online (e.g., downloaded or uploaded) directly between to users (e.g., smartphones). In the case of online distribution, at least a portion of the computer program product may be at least temporarily stored or temporarily generated in a server of the manufacturer, a server of the application store, or a machine-readable storage medium such as memory of a relay server.

According to the embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

What is claimed is:

1. An adaptor comprising:
   an input circuit configured to rectify an alternating current (AC) power input from outside the adaptor to a direct current (DC) voltage;
   a first converter configured to convert the DC voltage to a first DC voltage in a first specific level;
   a second converter configured to convert the DC voltage to a second DC voltage in a second specific level; and
   an output circuit configured to apply the first DC voltage and the second DC voltage to an electronic apparatus including a power factor correction (PFC) circuit,
   wherein the second specific level of the second DC voltage that is output from the second converter is smaller than the first specific level of the first DC voltage that is output from the first converter.

2. The adaptor of claim 1, wherein the electronic apparatus is further configured to:
   boost the first DC voltage applied from the adaptor through the PFC circuit,
   convert the boosted first DC voltage to a low voltage, and
   apply the low voltage to one or more components of the electronic apparatus.

3. The adaptor of claim 2, wherein the boosted first DC voltage through the PFC circuit is converted to a first voltage and applied to a display panel of the electronic apparatus, and the boosted first DC voltage through the PFC circuit is converted to a second voltage and applied to a main board of the electronic apparatus.

4. The adaptor of claim 1, wherein the input circuit comprises a rectification circuit that rectifies the AC power to the DC voltage.

5. The adaptor of claim 1, wherein the first converter comprises at least one of a half bridge converter, a full bridge converter, a flyback converter and a logical link control (LLC) resonant converter.

6. A power supply method of an adaptor, the power supply method comprising:
   rectifying an alternating current (AC) power input from outside the adaptor to a direct current (DC) voltage;
   converting the DC voltage to a first DC voltage in a first specific level;
   converting the DC voltage to a second DC voltage in a second specific level; and
   applying the first DC voltage and the second DC voltage to an electronic apparatus including a power factor correction (PFC) circuit,
   wherein the second specific level of the second DC voltage is smaller than the first specific level of the first DC voltage.

7. The power supply method of the adaptor of claim 6, further comprising:
   boosting the first DC voltage applied from the adaptor through the PFC circuit,
   converting the boosted first DC voltage to a low voltage, and
   applying the low voltage to one or more components of the electronic apparatus.

8. The power supply method of the adaptor of claim 7, wherein the boosted first DC voltage through the PFC circuit is converted to a first voltage and applied to a display panel of the electronic apparatus, and the boosted first DC voltage through the PFC circuit is converted to a second voltage and applied to a main board of the electronic apparatus.

9. The power supply method of the adaptor of claim 6, wherein the rectifying comprises, based on the AC power being input from an outside, rectifying the AC power to the DC voltage using a rectification circuit.

10. The power supply method of the adaptor of claim 6, wherein the converting comprises converting the DC voltage to the first DC voltage in the first specific level using at least one of a half bridge converter, a full bridge converter, a flyback converter and a logical link control (LLC) resonant converter.

11. A power supply system comprising:
an adaptor configured to:
rectify an alternating current (AC) power input from outside the adaptor to a direct current (DC) voltage; and
convert the DC voltage to a first DC voltage in a first specific level;
convert the DC voltage to a second DC voltage in a second specific level; and an electronic apparatus configured to:
receive, from the adaptor, the first DC voltage and the second DC voltage, and
boost the first DC voltage through a power factor correction (PFC) circuit.

12. The power supply system of claim 11, wherein the electronic apparatus is configured to:
convert the boosted first DC voltage to a low voltage and apply the low voltage to one or more components of the electronic apparatus.

13. The power supply system of claim 12, wherein the electronic apparatus is configured to:
convert the boosted first DC voltage to a first voltage and apply the first voltage to a display panel of the electronic apparatus, and
convert the boosted first DC voltage to a second voltage and apply the second voltage to a main board of the electronic apparatus.

14. The power supply system of claim 11, wherein the adaptor comprises a rectification circuit that rectifies the AC power to the DC voltage.

15. The power supply system of claim 11, wherein the adaptor is configured to convert the AC power to the first DC voltage in the first specific level using at least one of a half bridge converter, a full bridge converter, a flyback converter and a logical link control (LLC) resonant converter.

* * * * *